(12) United States Patent
Hamada

(10) Patent No.: US 12,321,671 B2
(45) Date of Patent: Jun. 3, 2025

(54) BASE MODEL SELECTION DEVICE AND BASE MODEL SELECTION METHOD

(71) Applicant: Mitsubishi Electric Corporation, Tokyo (JP)

(72) Inventor: Yasutaka Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 906 days.

(21) Appl. No.: 17/293,307

(22) PCT Filed: Sep. 20, 2019

(86) PCT No.: PCT/JP2019/036936
§ 371 (c)(1),
(2) Date: May 12, 2021

(87) PCT Pub. No.: WO2020/144898
PCT Pub. Date: Jul. 16, 2020

(65) Prior Publication Data
US 2021/0406417 A1    Dec. 30, 2021

(30) Foreign Application Priority Data

Jan. 10, 2019 (JP) ................................. 2019-002364

(51) Int. Cl.
*G06F 30/15* (2020.01)
*G06F 16/903* (2019.01)
(Continued)

(52) U.S. Cl.
CPC ........ *G06F 30/15* (2020.01); *G06F 16/90335* (2019.01); *G06F 2111/04* (2020.01); *G06F 2119/14* (2020.01); *G06F 2119/20* (2020.01)

(58) Field of Classification Search
CPC ............... G06F 30/15; G06F 16/90335; G06F 2111/04; G06F 2119/14; G06F 2119/20;
(Continued)

(56) References Cited

FOREIGN PATENT DOCUMENTS

| CN | 107430635 A | 12/2017 |
|---|---|---|
| JP | H05165900 A | 7/1993 |

(Continued)

OTHER PUBLICATIONS

Vareilles, Élise, et. al. "How to take into account general and contextual knowledge for interactive aiding design: Towards the coupling of CSP and CBR approaches." Engineering Applications of Artificial Intelligence 25, No. 1 (2012): 31-47. (Year: 2012).*

(Continued)

*Primary Examiner* — Brian S Cook
(74) *Attorney, Agent, or Firm* — BUCHANAN, INGERSOLL & ROONEY PC

(57) ABSTRACT

A storage stores base model master data including specification data for reference models and for past cases. A searcher in a calculator performs a data search on the base model master data using a requested specification input as a search key. A list creator creates a base model list listing a selected base model and specification data for the base model. The searcher determines whether at least one of the reference models satisfies the requested specification, selects, in response to at least one of the reference models satisfying the requested specification, the at least one reference model and adds the at least one reference model to the base model list, and selects, in response to the reference models dissatisfying the requested specification, a base model satisfying the requested specification from the past cases and adds the base model selected from the past case to the base model list.

17 Claims, 8 Drawing Sheets

(51) Int. Cl.
*G06F 111/04* (2020.01)
*G06F 119/14* (2020.01)
*G06F 119/20* (2020.01)

(58) Field of Classification Search
CPC .......... G06F 30/00; G06F 30/17; G06F 30/18;
G06F 30/20; G06F 30/23; G06F 30/30;
G06F 30/327; G06F 30/33; G06F
30/3312; G06F 30/34; G06F 30/36; G06F
30/39; G06F 30/392; G06F 30/394
USPC .......................................................... 703/20
See application file for complete search history.

(56) References Cited

FOREIGN PATENT DOCUMENTS

| JP | 2002189938 A | | 7/2002 |
|---|---|---|---|
| JP | 2003186945 A | | 7/2003 |
| JP | 2018022374 A | * | 2/2018 |

OTHER PUBLICATIONS

Moore, Ramon E., R. Baker Kearfott, and Michael J. Cloud. "Introduction to interval analysis". Society for Industrial and Applied Mathematics, 2009. (Year: 2009).*

Mittal, Sanjay, and Felix Frayman. "Towards a Generic Model of Configuraton Tasks." In IJCAI, vol. 89, pp. 1395-1401. 1989. (Year: 1989).*

Li, Jingxin. "A novel approach to computer-aided configuration design based on constraint satisfaction paradigm." PhD diss., University of Saskatchewan, 2005. (Year: 2005).*

Sqalli, Mohammed H., and Eugene C. Freuder. "Integration of CSP and CBR to compensate for incompleteness and incorrectness of models." In the AAAI-98 Spring Symposium on Multimodal Reasoning. 1998. (Year: 1998).*

Huang, Y. (2007). "Machine learning in customer-driven product configuration based on lifecycle metrics". Master's thesis, Nanyang Technological University, Singapore. https://doi.org/10.32657/10356/13602 (Year: 2007).*

Rong, Ruowen. "Toward the paradigm of a knowledge based electromagnetic design system: a case based reasoning approach." (1995) McGill University Thesis. (Year: 1995).*

International Search Report (PCT/ISA/210) with translation and Written Opinion (PCT/ISA/237) mailed on Nov. 26, 2019, by the Japan Patent Office as the International Searching Authority for International Application No. PCT/JP2019/036936.

Office Action dated Jun. 21, 2024, issued in the corresponding Chinese Patent Application No. 201980088062.3, 25 pages including 13 pages of English Translation.

* cited by examiner

FIG. 3

| | | SEARCH KEY | | | | |
|---|---|---|---|---|---|---|
| AIR-CONDITIONING APPARATUS CATEGORY | MOUNT POSITION | ON ROOF | ON FLOOR | IN FLOOR | UNDER FLOOR | OTHERS |
| | INSTALLED APPARATUS NO | CENTRALIZED | SEMI-CENTRALIZED | | DISTRIBUTED | OTHERS |
| | APPARATUS STRUCTURE | SEPARATE | UNIT | OTHERS | | |
| COOLING CAPACITY | | (UPPER LIMIT) | (LOWER LIMIT) | | | |
| REFRIGERANT TYPE | | R407C | F-12 | R12 | R22 | OTHERS |
| HEATER PRESENCE | | PRESENT | ABSENT | | | |
| MAIN POWER | VOLTAGE | 400V | 200V | OTHERS | | |
| | DISTRIBUTION SYSTEM | SINGLE PHASE | THREE PHASES | | | |
| CONTROL VOLTAGE | | 200V | 100V | OTHERS | | |
| SHIPMENT START TIME | | | | | | |

BASE MODEL SELECTION DEVICE AND BASE MODEL SELECTION METHOD

TECHNICAL FIELD

The present disclosure relates to a base model selection device, a base model selection method, and a program for selecting a base model of a product to be developed.

BACKGROUND ART

Product development at production sites includes iterative development involving selecting a base model of a new product and partially changing the model. For example, in-vehicle cooling apparatuses are developed mainly by iterative development based on a base model. Base models have been selected based on the knowledge of designers, and methods for assessing the base models and the selection references remain unquantified. This can cause variations in the results of base model selection. The selection results may cause the products to dissatisfy the specifications of the order, possibly causing design rework or more man-hours for design than expected.

In response to this issue, systems have been developed for searching past data and reference model data in accordance with the specifications of an order in model selection (see, for example, Patent Literature 1). A design work system described in Patent Literature 1 can assist device selection for plant design. The design work system uses a database including company reference data, past data, and a catalog that include model data. The system also includes a server storing multiple tools including a tool for assisting device selection and estimation work. The design work system provides an appropriate tool for a designer to efficiently perform the tasks.

CITATION LIST

Patent Literature

Patent Literature 1: Unexamined Japanese Patent Application Publication No. 2003-186945

SUMMARY OF INVENTION

Technical Problem

With the technique described in Patent Literature 1, a server searches the database including company reference data, past data, and a catalog by using a keyword. The designer can select, on the search screen, a search target from the company reference data, the past data, and the catalog. This search may provide different results in model selection depending on the knowledge or the skill of the designer, and thus fails to stably select an optimum model in quality, costs, and delivery time.

This system is not designed to select a model in accordance with the specifications of the order, and thus cannot respond to requests from various clients. A selected base model that is not optimum may undergo more changes, and may yield products that dissatisfy the client in quality, costs, and delivery time.

An objective of the present disclosure is to provide a base model selection device, a base model selection method, and a program that enable stable selection of optimum devices in response to various requested specifications.

Solution to Problem

To achieve the above objective, a base model selection device according to an aspect of the present disclosure includes a storage that stores base model master data including specification data for reference models and specification data for past cases, a searcher that performs a data search on the base model master data using a requested specification as a search key, and a list creator that creates a base model list listing a base model selected by the searcher and specification data for the base model. The searcher determines whether at least one of the reference models satisfies the requested specification. The searcher selects, in response to at least one of the reference models satisfying the requested specification, the at least one reference model and adds the at least one reference model to the base model list. The searcher selects, in response to the reference models dissatisfying the requested specification, a base model satisfying the requested specification from the past cases and adds the base model selected from the past cases to the base model list.

Advantageous Effects of Invention

According to the above aspect of the present disclosure, a reference model that is advantageous in quality, costs, and delivery time is selected preferentially. This enables stable selection of optimum devices in response to various requested specifications.

BRIEF DESCRIPTION OF DRAWINGS

FIG. 3 is a table listing examples of search keys for an in-vehicle air-conditioning apparatus categorized by each item;

DESCRIPTION OF EMBODIMENTS

Embodiment 1

Embodiment 1 of the present disclosure will now be described in detail with reference to the drawings.

Figure 1:
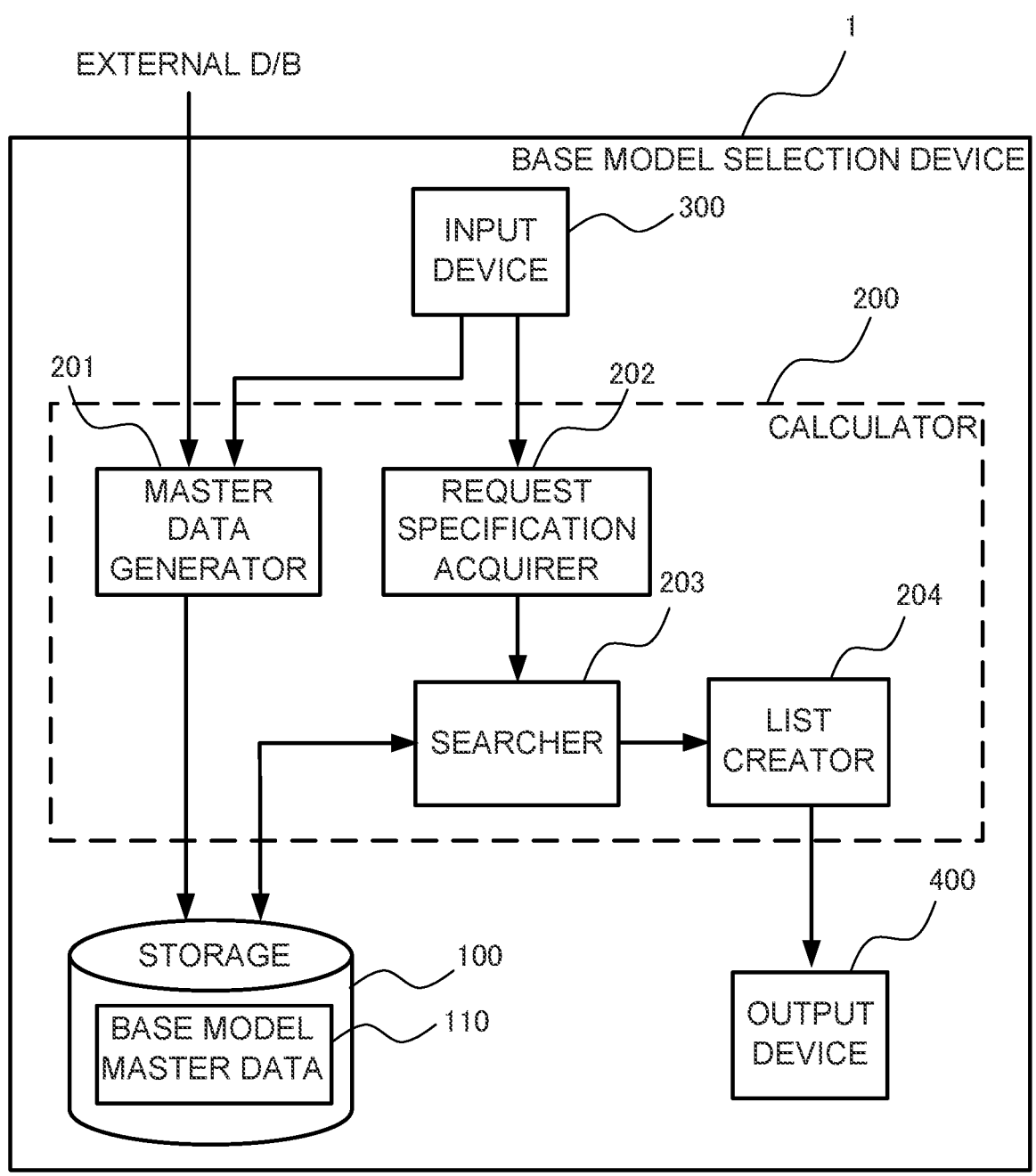
FIG. 1 is a block diagram of a base model selection device according to an embodiment of the present disclosure, showing an example structure.

FIG. 1 is a block diagram of a base model selection device 1 according to Embodiment 1, showing an example structure. The base model selection device 1 selects a base model for product development in response to requested specifications, that is, specifications of an order from a client, and provides a selected model to a developer. The base model includes past similar models or reference models and is to be referred to for starting to design. The base model may dissatisfy any of the specifications of the order. Such a base model is modified or changed for product development.

The base model selection device 1 includes a storage 100, a calculator 200, an input device 300, and an output device 400. The storage 100 stores base model master data 110 including information about product models selectable as base models. The calculator 200 creates a list of base models selected by performing a search process on the base model master data 110. The input device 300 inputs operations of an operator. The output device 400 outputs the list of base models.

The storage 100 stores the base model master data 110 that is integrated, using model names indicating product names as keys, based on information acquired from external databases (hereafter referred to as D/Bs) connected to the base model selection device 1, or based on inputs by the operator to the input device 300.

Figure 2:
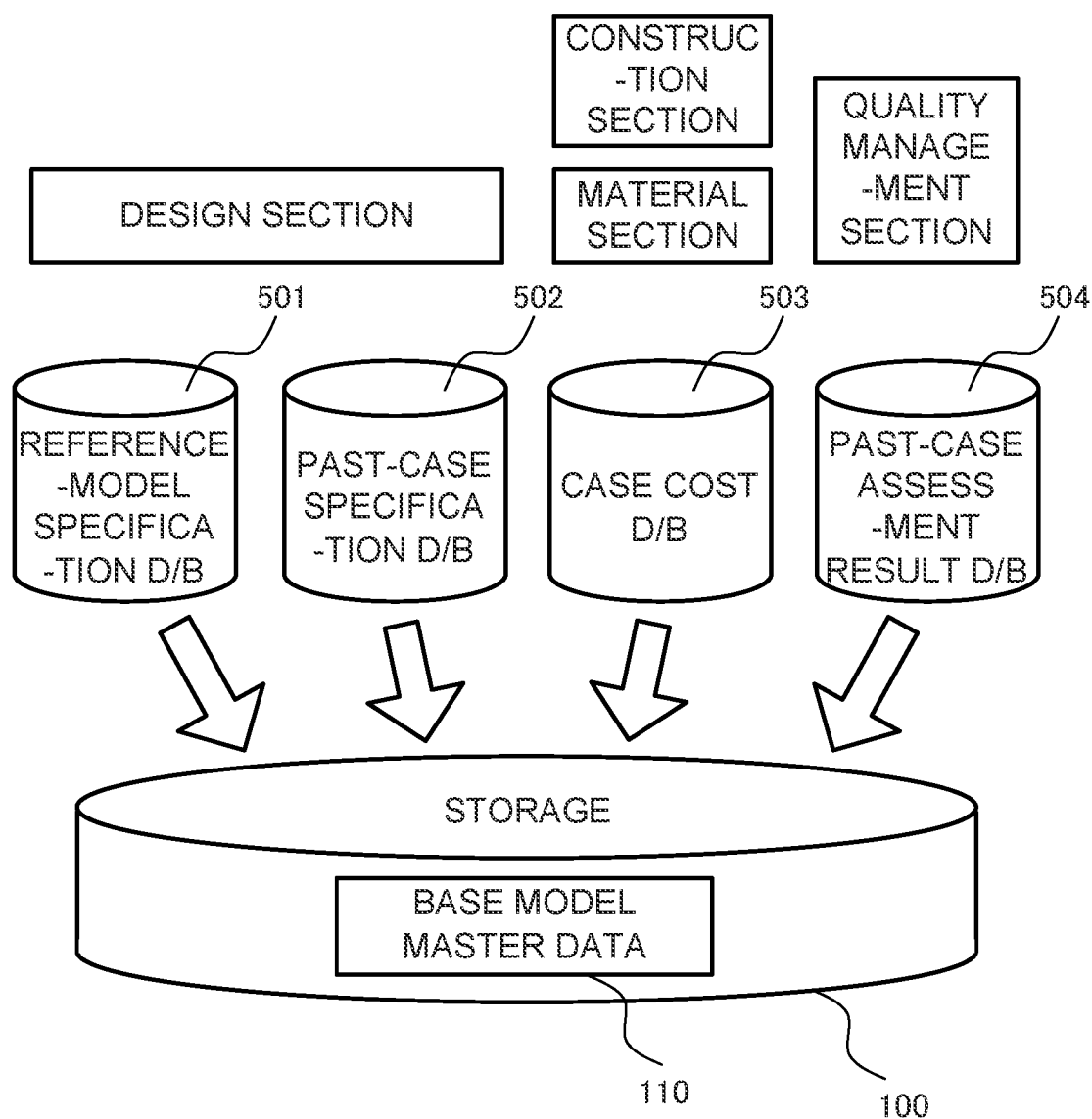
FIG. 2 is a schematic diagram of base model master data stored in a storage.

FIG. 2 is a schematic diagram of the base model master data 110 stored in the storage 100. A design section holds databases storing information relating to designs of various products linked with model names indicating product names. The databases held by the design section include a reference-model specification D/B 501 storing information on reference models, and a past-case specification D/B 502 storing information on past cases. Information stored in the reference-model specification D/B 501 and the past-case specification D/B 502 is any information relating to designs of various products, for example, structure information including information on parts forming each product and the hierarchical structure of each part, specification information including the characteristics or performance of products in a digitalized or textual form, attribute information indicating the attributes of products other than the specifications, and graphic information showing a diagram of the profile or wiring of each product and a graph indicating the performance of the product.

A construction section or a material section holds a database storing information relating to the costs of past cases linked with model names indicating product names. The database held by the construction section or the material section includes a case cost D/B 503 for each past case. Information stored in the case cost D/B 503 is any information relating to the costs for each past case, for example, cost details including the unit price of each of parts forming a product, depreciation expenses of manufacturing machine tools or equipment, personnel expenses, and the sum of these costs. The case cost D/B 503 also stores the shipment start time of each past case, the current unit price of each part, the current depreciation expenses, the current personnel expenses, and the total cost acquired by converting the past case costs into the current values.

A quality management section holds a database storing information relating to the assessment results of the past cases linked to model names indicating product names. The database held by the quality management section includes a past-case assessment result D/B 504. The past-case assessment result D/B 504 stores any information relating to the assessment of each past case, for example, graphic information including a table or graph indicating an assessment method, an evaluator, and assessment results of each past case.

The storage 100 in the base model selection device 1 stores the base model master data 110. The base model master data 110 includes data items acquired from external D/Bs that are the reference-model specification D/B 501, the past-case specification D/B 502, the case cost D/B 503, and the past-case assessment result D/B 504. The data items are linked with model names. More specifically, information relating to a product indicated with a model name and including structure information, specification information, attribute information, graphic information, cost information, and assessment information is integrated as the base model master data 110.

The base model master data 110 may include data generated through an input by the operator to the input device 300. Data is input with a data registration template. Each person in charge of the section inputs, to the data registration template, information including structure information, specification information, attribute information, graphic information, cost information, and assessment information about each product. Related information may be automatically introduced into the data registration template. For example, when a part of a model name corresponds to an air-conditioning equipment category, the structure information about the product is automatically introduced to the corresponding space.

The data registration template has a form that receives inputs for each model to prevent human errors during inputs. For example, the data registration template for the same product stored in the storage 100 is set accessible by persons in charge of the design section, the construction section, the material section, and the quality management section. For the data registration template for each product, information on the registration state of each section, including input in process, pending, and approved is also stored. An approval of a superior of the person in charge of each section may also be registered. When a defect is found in a checking operation at each section, inputs and checking operations are repeatedly performed. Data on a product that has completed approval of all the checks is added to the base model master data 110 as a search target selectable as a base model.

The calculator 200 is a processor that executes a program stored in the storage 100, for example, a central processing unit (CPU). The calculator 200 executes a program to function as a master data generator 201 that generates the base model master data 110, a request specification acquirer 202 that acquires requested specifications of order products, a searcher 203 that searches the base model master data 110 to select a base model satisfying requested specifications, and a list creator 204 that creates a list indicating the search results.

The master data generator 201 links, with a model name for integration, data acquired from external D/Bs that are the reference-model specification D/B 501, the past-case specification D/B 502, the case cost D/B 503, and the past-case assessment result D/B 504 and generates the base model master data 110. The master data generator 201 generates the base model master data 110 based on data input into the input device 300 with the data registration template. The generated base model master data 110 is stored into the storage 100 and updated as appropriate.

The request specification acquirer 202 acquires requested specifications of order products input by the operator to the input device 300, and outputs the acquired requested specifications to the searcher 203. The searcher 203 searches the base model master data 110 with the requested specifications output by the request specification acquirer 202 as search keys.

Examples of search keys based on requested specifications for an in-vehicle air-conditioning apparatus will be described. FIG. 3 is a table listing examples of search keys for an in-vehicle air-conditioning apparatus categorized by each item. Categories of air-conditioning apparatuses include specifications of a mount position, the number of installed apparatuses, and an apparatus structure. Search keys for the mount position include on the roof, on the floor, in the floor, under the floor, and others. Search keys for the number of installed apparatuses include centralized (one for each vehicle), semi-centralized (two for each vehicle), distributed (three or more for each vehicle), and others. Search keys for the apparatus structure include separate, unit, and others. Searches using these search keys are performed by selecting a model having specifications matching the search keys from the base model master data 110.

The specifications relating to air-conditioning functions include the cooling capacity, the refrigerant type, heater presence, a main power voltage, a main power distribution system, and a control voltage. Search keys for the refrigerant type include R407C, F-12, R12, R22, and others. Heater presence also serves as a search key. Search keys for the main power voltage include 400 V, 200 V, and others. Search keys for the main power distribution system include single phase and three phases. Search keys for the control voltage includes 200 V, 100 V, and others. Searches using these search keys are performed by selecting a model having specifications matching the search keys from the base model master data 110.

The cooling capacity, serving as the specification of driving performance of an air-conditioning apparatus, is defined with the upper limit and the lower limit of requested specifications to which the model is applicable. The upper limit and the lower limit may be a ratio to the cooling capacity or any numerical value. Such searches using search keys for the cooling capacity are performed by selecting a model having a cooling capacity defined by the upper limit and the lower limit from the base model master data 110. More specifically, the target of search is a model in the case of a cooling capacity in the requested specifications being within a range of ±5% of the cooling capacity of the model included in the reference models or past cases. To use more reference models, the lower limit may be lowered to search a reference model in the case of a cooling capacity in the requested specifications being within a range of −20 to +5% of the cooling capacity of the reference model. For products other than an air-conditioning apparatus, lowering the lower limit of the driving performance causes no issue with performance, and is effective for using more reference products.

Search keys for the shipment start time are used for searches to select models shipped after the input timing. Limiting the shipment start time prevents selection of products non-producible due to discontinuation of production of parts.

The base model master data 110 stored in the storage 100 and the requested specifications input into the input device 300 are generated in accordance with the specification items as shown in FIG. 3. The data registration template for data inputs also has a similar form that receives inputs categorized by each item.

The searcher 203 first searches reference model data in the base model master data 110. When no reference models satisfy the requested specifications, the searcher 203 then searches past case data. The reference models are advantageous in quality, price, and delivery time, and thus are preferably selected. For example, the requested specifications may be categorized into primary specifications and supplementary specifications, and the searcher 203 may determine selection of a reference model satisfying the primary specifications. In some embodiments, the requested specifications may additionally include an order of priority, and the searcher 203 may select a reference model satisfying specific items with a higher priority. Categorization of the primary specifications and supplementary specifications, or the priority added to the requested specifications is determined based on information including the importance of the specification, modification difficulty, and costs for modification.

The list creator 204 creates a base model list listing the base models selected from the search by the searcher 203. The list creator 204 arranges the reference models in order from a model satisfying more specifications, or from a model satisfying a specification with a higher priority. The list creator 204 arranges the past cases in ascending order of total cost of each case included in the base model master data 110. The list creator 204 arranges the past cases in ascending order of total cost based on the amount of money acquired by converting the costs at the shipment start time into the current costs. In some embodiments, the list creator 204 arranges the past cases in descending order of the performance based on the past-case assessment results. In some embodiments, the list creator 204 arranges the past cases in reverse chronological order of production start year.

The input device 300 is any device for inputting information, for example, a keyboard or a pointing device including a mouse and a touch screen. Specification data for a model input into the input device 300 is input into the master data generator 201 in the calculator 200, and the requested specifications of an order product input into the input device 300 are input into the request specification acquirer 202 in the calculator 200.

The output device 400 includes a display that displays images or textual information. The output device 400 displays a model list created by the list creator 204 on the display. The output device 400 displays a data registration template for inputting model information about a reference model or a past case or a form for inputting requested specifications. The operator inputs data into the input device 300 for the template or the form. Inputs to the data registration template or the form may be performed through selection of preregistered options. In some embodiments, free inputs by the operator may be converted to predetermined words for storage in the storage 100 or for use as search keys.

Figure 4:
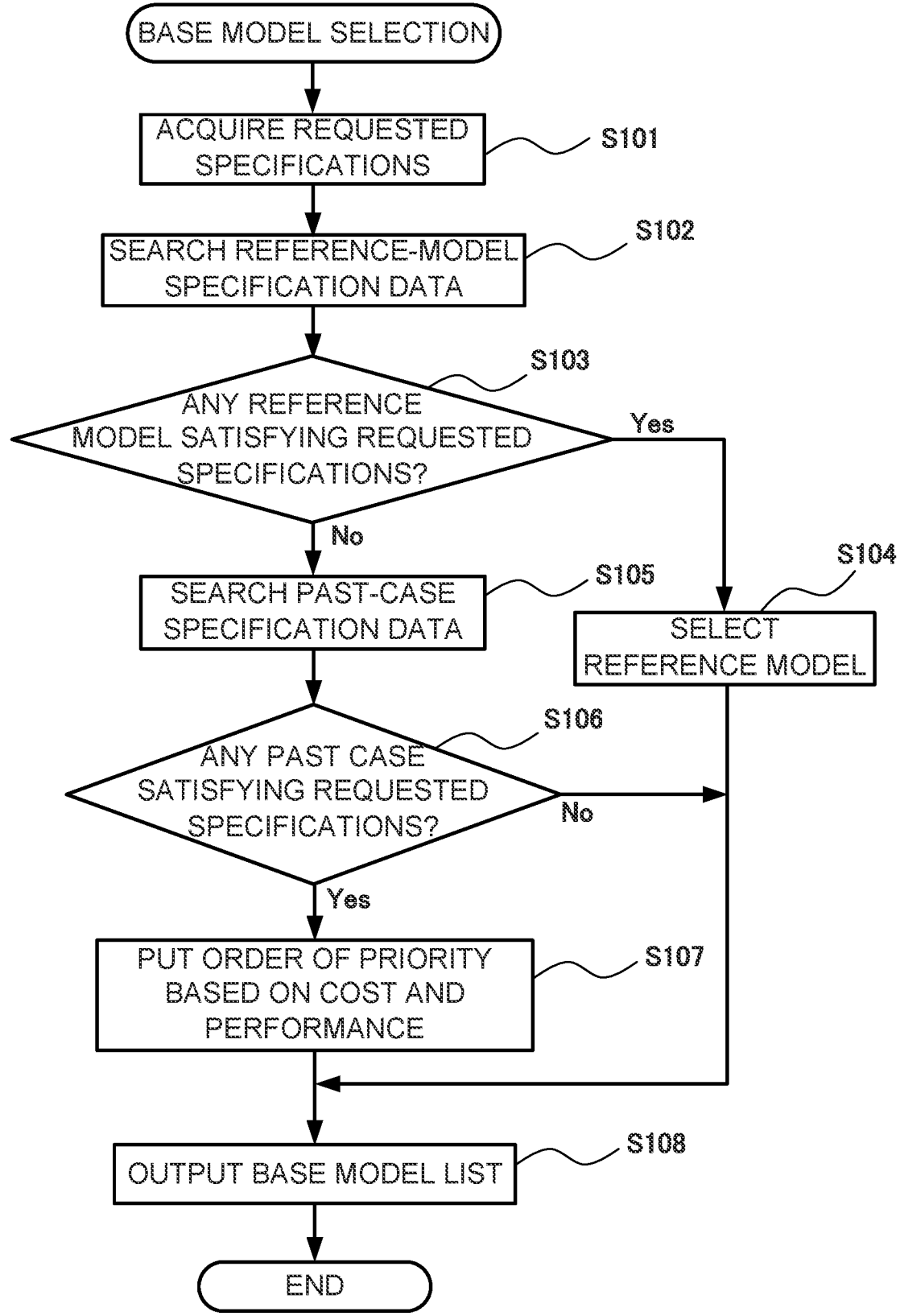
FIG. 4 is a flowchart showing a base model selection process according to Embodiment 1.

The operation of the base model selection device 1 with the above structure will be described with reference to the flowchart shown in FIG. 4. FIG. 4 is a flowchart showing a base model selection process.

The calculator 200 in the base model selection device 1 starts the base model selection process in response to the input device 300 receiving an input of the base model selection operation. Before the base model selection operation, the storage 100 stores the base model master data 110 generated by the master data generator 201 based on data acquired from the external D/Bs or data input into the input device 300.

The request specification acquirer 202 in the calculator 200 first acquires requested specifications of order products (step S101). The requested specifications to be acquired are input by the operator into the input device 300, and set for each item. Subsequently, the searcher 203 searches specification data for the reference models in the base model master data 110 using each item in the requested specifications as a search key (step S102).

After the search, the searcher 203 determines whether any reference model satisfies at least one of the requested specifications (step S103). The searcher 203 may determine whether any reference model satisfies primary specifications or specifications with a higher priority among the requested specifications. When at least one of the reference-model specifications satisfies the requested specifications (Yes in step S103), the reference model is selected (step S104). Thereafter, the list creator 204 creates a base model list including the specifications of the reference model, and outputs the base model list to the output device 400 (step S108). The base model list is displayed on the display serving as the output device 400.

When no reference model satisfies at least one of the requested specifications (No in step S103), the searcher 203 searches the specification data for past cases in the base model master data 110 using each item in the requested specifications as a search key (step S105).

After the search, the searcher 203 determines whether any past case satisfies at least one of the requested specifications (step S106). When any of the past-case specifications satisfies the requested specifications (Yes in step S106), the searcher 203 selects the past case. For the selected past case, the list creator 204 checks information on the case cost and information on the past-case assessment results included in the base model master data 110, and puts the order of priority on the case based on cost and performance (step S107). The order of priority is put based on the total cost acquired by converting the case cost at the shipment start time to the current cost.

The list creator 204 outputs a list of reference models selected in step S104 or a list of past cases on which the order of priorities is put in step S107 (step S108), and ends the process. The base model list is displayed on the display serving as the output device 400. In step S106, when the searcher 203 determines that no past case satisfies the requested specifications (No in step S106), the list creator 204 outputs the list with no applicable model in step S108.

Figure 5:
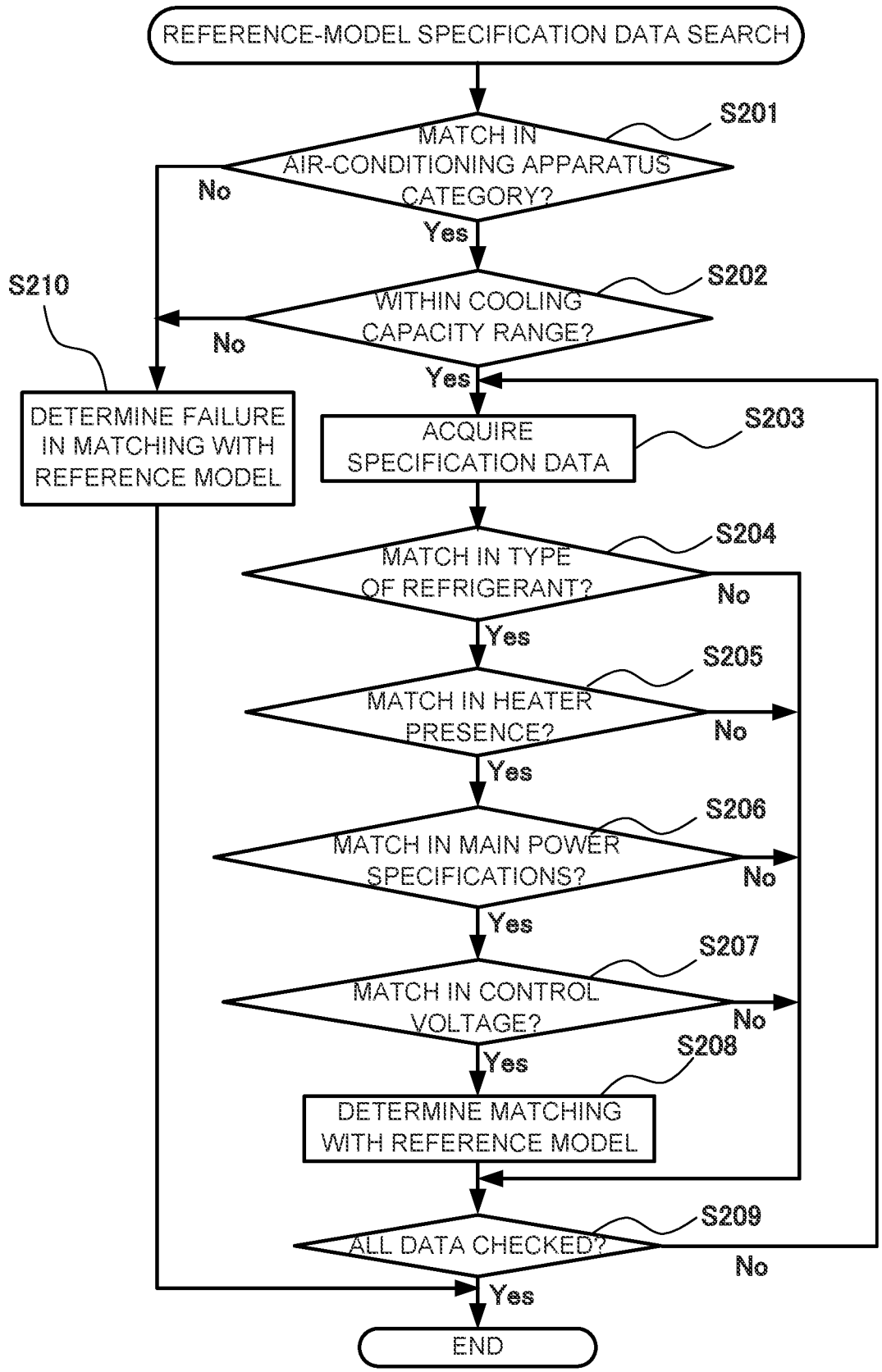
FIG. 5 is a flowchart showing a reference-model specification data search process according to Embodiment 1.

A process of searching specification data for a reference model included in the base model master data 110, performed by the searcher 203 in step S102 in FIG. 4, will be described in detail with reference to FIG. 5. FIG. 5 is a flowchart showing a process for searching specification data for the reference model of an air-conditioning apparatus.

The searcher 203 first determines whether the air-conditioning apparatus category of the requested specifications matches the air-conditioning apparatus category of a reference model (step S201). For example, for reference models limited to a centralized type for single installation or a semi-centralized type for twin installation, the searcher 203 determines that the air-conditioning apparatus categories match each other when the requested specifications are for a centralized or semi-centralized type and other categories also match each other. The searcher 203 determines that the air-conditioning apparatus categories fail to match each other when the requested specifications are for a distributed or another type. When the air-conditioning apparatus category of the requested specifications matches the air-conditioning apparatus category of the reference model (Yes in step S201), the process advances to step S202. When the air-conditioning apparatus category of the requested specifications fails to match the air-conditioning apparatus category of the reference model (No in step S201), the searcher 203 determines that the requested specifications fail to match the reference model (step S210), and ends the process.

For the number of installed air-conditioning apparatuses, two centralized reference models are applicable to the requested specifications for the semi-centralized type. Thus, the applicable range of the reference model can be expanded. In this case, the difference in the number of apparatuses is also reflected for other specifications to determine whether the other specifications of the reference model match the requested specifications. For example, the cooling capacity of two reference models is compared with the cooling capacity in the requested specifications.

Subsequently, the searcher 203 determines whether the cooling capacity in the requested specifications is within the specification data for the reference model (step S202). The searcher 203 determines that the cooling capacity in the requested specifications is within the cooling capacity range when the cooling capacity is within ±5% of the cooling capacity of the reference model (Yes in step S202). To use more reference models, the lower limit may be lowered to determine that a cooling capacity in the requested specifications is within the cooling capacity range when the cooling capacity is within a range of −20 to +5% of the cooling capacity of the reference model (Yes in step S202).

When the cooling capacity in the requested specifications is within the cooling capacity range (Yes in step S202), the process advances to step S203. When the cooling capacity in the requested specifications is out of the cooling capacity range (No in step S202), the searcher 203 determines that the requested specifications fail to match the reference model (step S210), and ends the process.

When the cooling capacity in the requested specifications is within the cooling capacity range (Yes in step S202), the searcher 203 acquires specification data for one of the reference models (step S203). Then, the searcher 203 sequentially checks the specifications. When all the specifications including the refrigerant type, heater presence, main power specifications, and the control voltage match each other (Yes in steps S204, S205, S206, and S207), the process advances to step S208. Then, the searcher 203 determines that the requested specifications match the checked specification data for the reference model (step S208), and outputs identification information about the reference model to the list creator 204. When at least one of the refrigerant type, heater presence, main power specifications, and the control voltage fails to match each other (No in at least one of steps S204, S205, S206, and S207), the process advances to step S209.

When all of the specification data are completely checked in step S209 (Yes in step S209), the process ends. When any specification data remains unchecked (No in step S209), the searcher 203 returns to step S203, and acquires specification data for the next one of the reference models (step S203).

Figure 6:
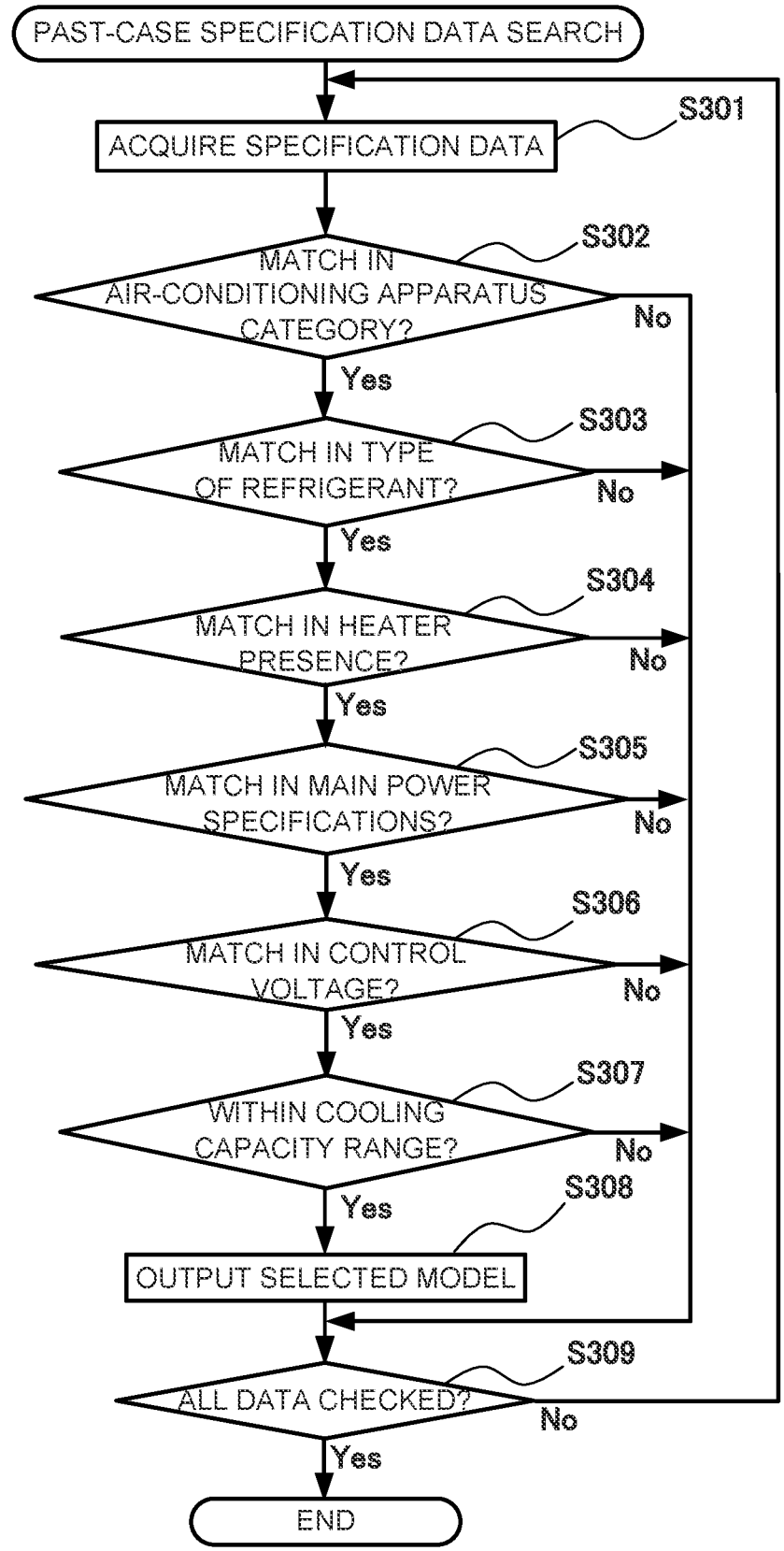
FIG. 6 is a flowchart showing a past-case specification data search process.

A process of searching specification data for past cases included in the base model master data 110, performed in step S105 in FIG. 4, will be described in detail with reference to FIG. 6. FIG. 6 is a flowchart showing a process of searching specification data for a past air-conditioning apparatus.

First, the searcher 203 acquires specification data for one of the past cases (step S301), and sequentially checks the specifications. When the air-conditioning apparatus category including the mount position, the number of installed apparatuses, and the air-conditioning apparatus structure shown in FIG. 3 matches each other (Yes in step S302), and all the properties including the refrigerant type, heater presence, main power specifications, and the control voltage match each other (Yes in steps S303, S304, S305, and S306), the process advances to step S307. When at least one of the air-conditioning apparatus category, the refrigerant type, heater presence, main power specifications, and the control voltage fails to match each other (No in at least one of steps S302, S303, S304, S305, and S306), the process advances to step S309.

In step S307, the searcher 203 determines whether the cooling capacity in the requested specifications is within the specification data for a past case. The searcher 203 determines that the cooling capacity in the requested specifications is within the cooling capacity range when the cooling capacity is within ±5% of the cooling capacity of the past case (Yes in step S307).

When the cooling capacity in the requested specifications is within the cooling capacity range (Yes in step S307), the searcher 203 outputs the past case having the checked specification data as a selected model (step S308). When the cooling capacity in the requested specifications is out of the cooling capacity range (No in step S307), the process advances to step S309.

When all of the specification data are completely checked in step S309 (Yes in step S309), the process ends. When any of the specification data remains unchecked (No in step S309), the searcher 203 returns to step S301, and acquires specification data for the next one of the past cases (step S301).

Thus, the searcher 203 searches the base model master data 110 using the requested specifications as search keys, first determines whether any reference model satisfies the requested specifications, and then determines whether any past case satisfies the requested specifications when no reference model satisfies the requested specifications. Thus, reference models that are advantageous in quality, costs, and delivery time can be selected preferentially. Selecting a reference model can reduce design man-hours and device costs. A uniformized logic or reference for base model selection can prevent selection of a base model dissatisfying the specifications, and reduce additional man-hours or cost for design rework. More specifically, a uniformized logic or reference for base model selection enables selection of an optimum base model without depending on the knowledge or skill of a designer.

As described above, the base model selection device 1 according to the present embodiment stores, in the storage, the base model master data 110 that integrates information acquired from the reference-model specification D/B 501, the past-case specification D/B 502, the case cost D/B 503, and the past-case assessment result D/B 504 and information input through the input device 300, and the searcher 203 searches the base model master data 110 using the requested specifications for each item as search keys. The searcher 203 first searches the specification data for the reference models, and selects a reference model satisfying the requested specifications. When no reference model satisfies the requested specifications, the searcher 203 searches the specification data for the past cases, and selects a past case satisfying the requested specifications. The list creator 204 creates a base model list listing the selected models arranged based on information about the case cost or the past-case assessment results, and outputs the list. Thus, the base model selection device 1 can preferentially select a reference model that is advantageous in quality, costs, and delivery time, and stably select optimum devices satisfying various requested specifications without depending on the knowledge of a designer.

Embodiment 2

Embodiment 2 of the present disclosure will now be described in detail with reference to the drawings. A base model selection device 1 according to Embodiment 2 also selects a base model for product development in response to requested specifications, that is, specifications of an order from a client, and provides a selected model to a developer. The base model includes past similar models or reference models and is to be referred to for starting to design. The base model may dissatisfy any of the specifications of the order. Such a base model is modified or changed for product development.

In Embodiment 2, among base models, a predeveloped model satisfying specifications based on many client requests is referred to as a reference development base model. Among reference development base models, a known model developed to satisfy optional specifications based on client requests, and that can minimize the development man-hours while satisfying the client requests is referred to as a reference model. The optional specifications are a group of specifications, for the reference development base models, patterned in advance in accordance with the client requests.

Figure 7:
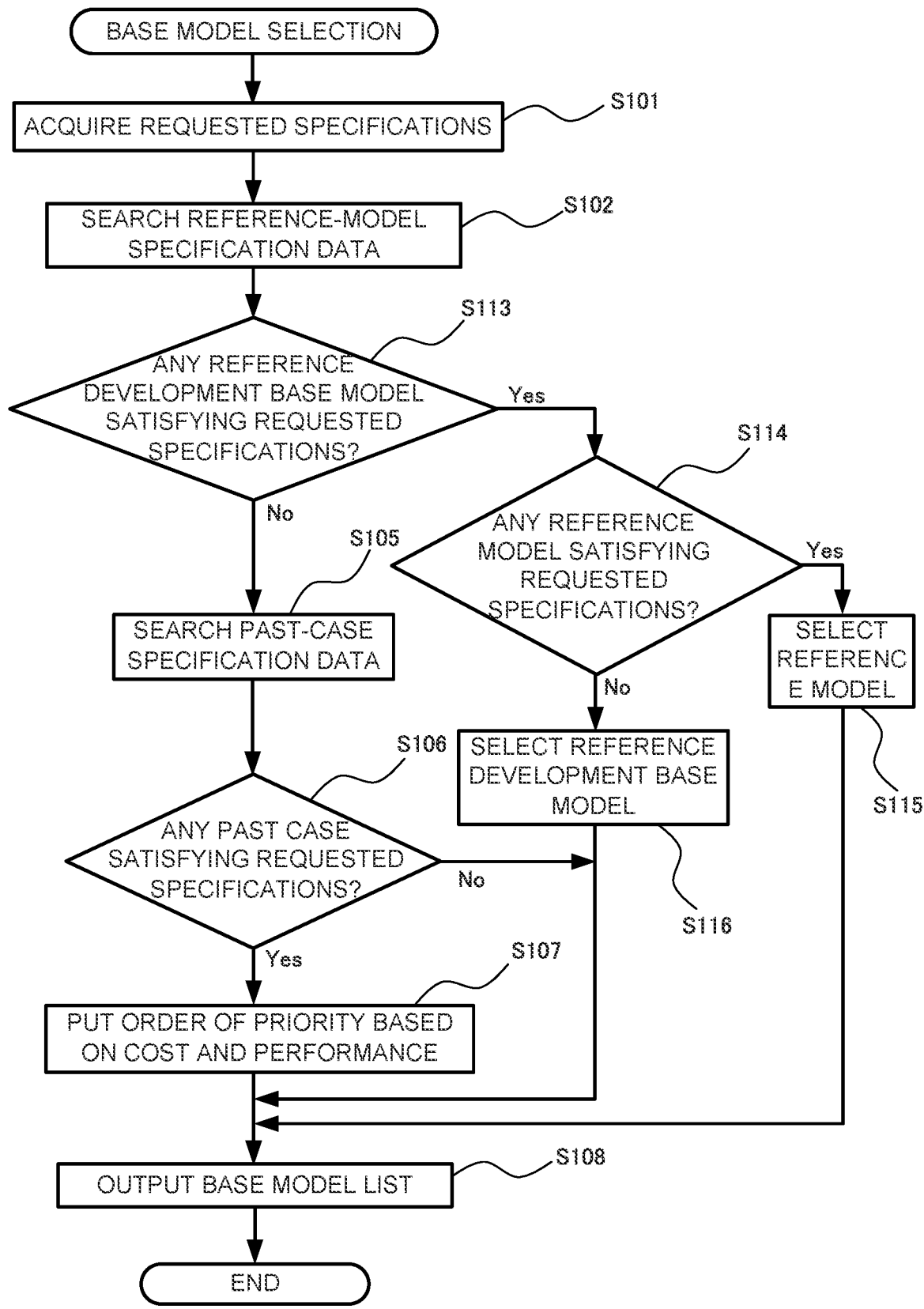
FIG. 7 is a flowchart showing a base model selection process according to Embodiment 2.
Figure 8:
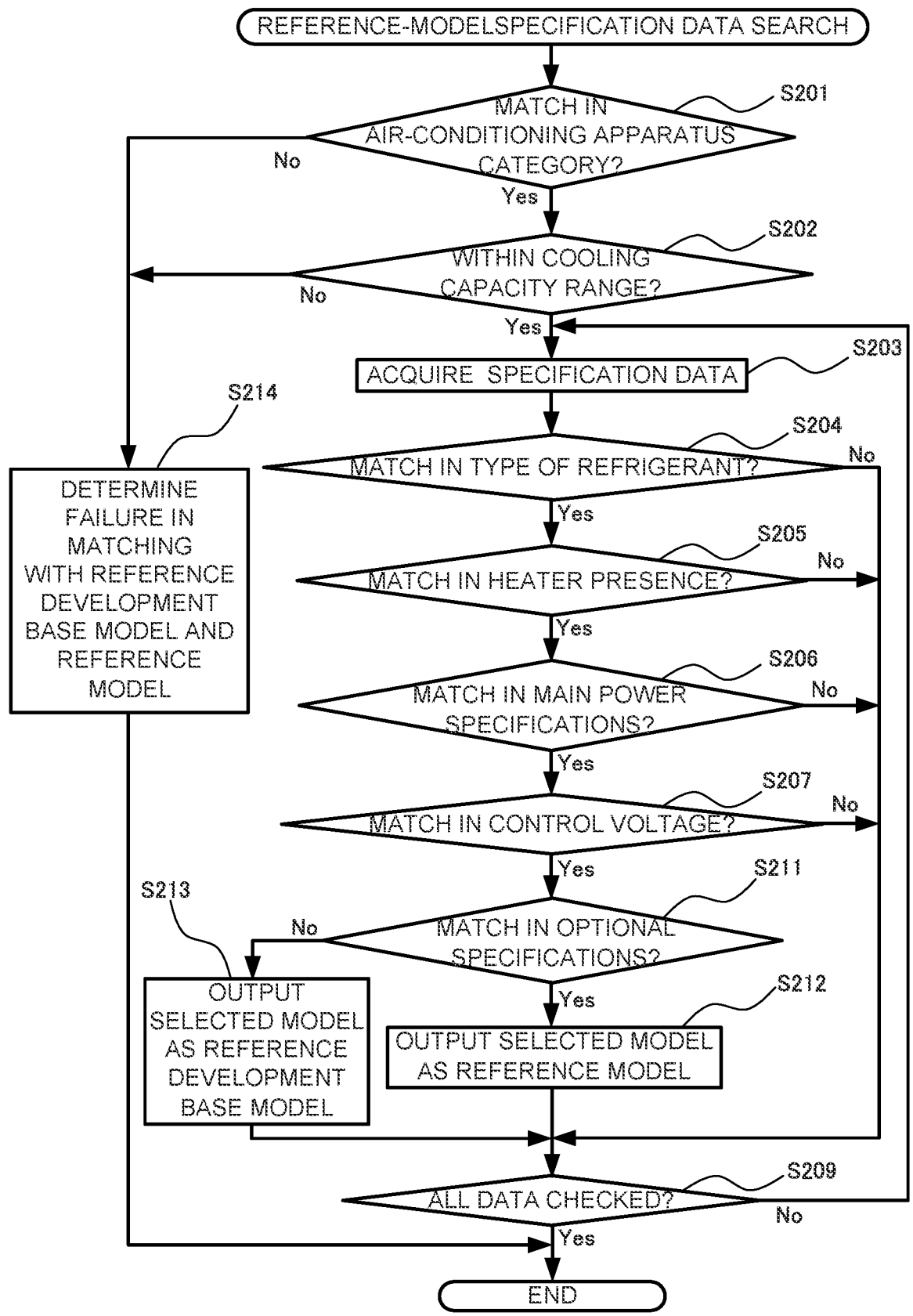
FIG. 8 is a flowchart showing a reference-model specification data search process according to Embodiment 2.

The base model selection device 1 according to Embodiment 2 has the same structure as the base model selection device 1 according to Embodiment 1. The processes performed by the searcher 203 in the base model selection device 1 according to Embodiment 2 differ from the processes performed by the searcher 203 in Embodiment 1. The processes performed by the searcher 203 will be described in detail with reference to FIGS. 7 and 8. FIG. 7 is a flowchart showing a base model selection process. FIG. 8 is a flowchart showing a process for searching specification data for a reference model of an air-conditioning apparatus.

The calculator 200 in the base model selection device 1 starts the base model selection process shown in FIG. 7 in response to the input device 300 receiving an input of a base model selection operation. Before the base model selection operation, the storage 100 stores the base model master data 110 generated by the master data generator 201 based on data acquired from the external D/Bs or data input through the input device 300.

The request specification acquirer 202 in the calculator 200 first acquires the requested specifications of order products (step S101). The requested specifications to be acquired are input by the operator into the input device 300, and set for each item. Subsequently, the searcher 203 searches specification data for the reference model in the base model master data 110 using each item in the requested specifications as a search key (step S102).

After the search, the searcher 203 determines whether any reference development base model satisfies at least one of the requested specifications (step S113). The searcher 203 may determine whether any reference development base model satisfies primary specifications or specifications with a higher priority among the requested specifications.

When at least one of the reference development base models satisfies the requested specifications (Yes in step S113), the searcher 203 determines whether any reference model has specifications including optional specifications satisfying the requested specifications (step S114). When the specifications of the reference model including the optional specifications satisfy the requested specifications (Yes in step S114), the searcher 203 selects the reference model (step S115). Selecting the reference model can reduce development design man-hours. Thus, a reference model satisfying the requested specifications is selected preferentially. When no reference model satisfies the requested specifications (No in step S114), the searcher 203 selects the reference development base model (step S116).

When no reference development base model satisfies at least one of the requested specifications (No in step S113), the searcher 203 searches specification data for past cases in the base model master data 110 using each item in the requested specifications as a search key (step S105).

After the search, the searcher 203 determines whether any past case satisfies at least one of the requested specifications (step S106). When any of the past-case specifications satisfies the requested specifications (Yes in step S106), the searcher 203 selects the past case. For the selected past case, the list creator 204 checks information on the case cost and information on the past-case assessment results included in the base model master data 110, and puts the order of priority on the case based on cost and performance (step S107). The order of priority is put based on the total cost acquired by converting the case cost at the shipment start time to the current cost.

The list creator 204 outputs a list of reference models selected in step S115, a list of a reference development base model selected in step S116, or a list of past cases on which the order of priorities is put in step S107 to the output device 400 (step S108), and ends the process. The base model list is displayed on the display serving as the output device 400. In step S106, when the searcher 203 determines that no past case satisfies the requested specifications (No in step S106), the list creator 204 outputs the list with no applicable model in step S108.

A process of searching specification data for a reference model included in the base model master data 110, performed by the searcher 203 in step S102 in FIG. 7, will be described in detail with reference to FIG. 8.

First, the searcher 203 determines whether the air-conditioning apparatus category of the requested specifications matches the air-conditioning apparatus category of a reference development base model (step S201). For example, for reference development base models limited to a centralized type for single installation or a semi-centralized type for twin installation, the searcher 203 determines that the air-conditioning apparatus categories match each other when the requested specifications are for a centralized or semi-centralized type and other categories also match each other. The searcher 203 determines that the air-conditioning apparatus categories fail to match each other when the requested specifications are for a distributed or another type. When the air-conditioning apparatus category of the requested specifications matches the air-conditioning apparatus category of the reference development base model (Yes in step S201), the process advances to step S202. When the air-conditioning apparatus category of the requested specifications fails to match the air-conditioning apparatus category of the reference development base model (No in step S201), the searcher 203 determines that the requested specifications fail to match the reference development base model and the reference model (step S214), and ends the process.

For the number of installed air-conditioning apparatuses, two centralized reference development base models are applicable to the requested specifications for the semi-centralized type. Thus, the applicable range of the reference development base model can be expanded. In this case, the difference in the number of apparatuses is also reflected for other specifications to determine whether the other specifications of the reference model match the requested specifications. For example, the cooling capacity of two reference development base models is compared with the cooling capacity in the requested specifications.

Subsequently, the searcher 203 determines whether the cooling capacity in the requested specifications is within the specification data for the reference development base model (step S202). The searcher 203 determines that the cooling capacity in the requested specifications is within the cooling capacity range when the cooling capacity is within ±5% of the cooling capacity of the reference development base model (Yes in step S202). To use more reference development base models, the lower limit may be lowered to determine that a cooling capacity in the requested specifications is within the cooling capacity range when the cooling capacity is within a range of −20 to +5% of the cooling capacity of the reference development base model (Yes in step S202).

When the cooling capacity in the requested specifications is within the cooling capacity range (Yes in step S202), the process advances to step S203. When the cooling capacity in the requested specifications is out of the cooling capacity range (No in step S202), the searcher 203 determines that the requested specifications fail to match the reference development base model and the reference model (step S214), and ends the process.

When the cooling capacity in the requested specifications is within the specification data for the reference development base model (Yes in step S202), the searcher 203 acquires specification data for one of the reference development base models (step S203). Then, the searcher 203 sequentially checks the specifications. When all the specifications including the refrigerant type, heater presence, main power specifications, and the control voltage match each other (Yes in steps S204, S205, S206, and S207), the process advances to step S211. When at least one of the refrigerant type, heater presence, main power specifications, and the control voltage fails to match each other (No in at least one of steps S204, S205, S206, and S207), the process advances to step S209.

Subsequently, the searcher 203 determines whether the requested specifications match the optional specifications of a reference model in step S211. When the requested specifications match the optional specifications (Yes in step S211), the searcher 203 selects the model having the checked specification data, and outputs the selected model as a reference model (step S212). When the requested specifications fail to match the optional specifications (No in step S211), the searcher 203 outputs the selected model as a reference development base model (step S213).

Thereafter, when all of the specification data are completely checked in step S209 (Yes in step S209), the process ends. When any specification data remains unchecked (No in step S209), the searcher 203 returns to step S203, and acquires specification data for the next one of the reference development base models (step S203).

A process of searching specification data for past cases included in the base model master data 110, performed in step S105 in FIG. 7, is similar to the process according to Embodiment 1.

As described above, in the search of specification data for a reference model, the base model selection device 1 according to the present embodiment searches a reference development base model satisfying the requested specifications. When at least one reference development base model satisfies the requested specifications, the base model selection device 1 further determines whether the requested specifications match the specifications of the reference model including optional specifications. When the requested specifications match the specifications including the optional specifications, the base model selection device 1 selects the reference model. When the requested specifications dissatisfy the optional specifications, the base model selection device 1 selects a reference development base model. Thus, a reference model that can minimize development man-hours can be selected from the reference development base models.

Thus, in the present disclosure, the base model master data including the specification data for the reference models and the specification data for the past cases is stored into the storage in advance, a data search is performed on the base model master data using the requested specifications as search keys, and the base model list including the selected base model and the specification data for the base model is created. In the search, whether any reference model satisfies the requested specifications is determined. When at least one reference model satisfies the requested specifications, the reference model is selected and included in the base model list. When no reference model satisfies the requested specifications, the base model satisfying the requested specifications is selected from the past cases and the selected past case is included in the base model list. Thus, optimum devices satisfying various requested specifications can be stably selected.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

For example, in the reference-model specification data search process and the past-case-model specification data search process shown in FIGS. 5 and 6, the base model selection device according to any of the above embodiments selects a model satisfying the air-conditioning apparatus category, the refrigerant type, heater presence, main power specifications, and the control voltage, but may select a model satisfying at least one of these specifications. For example, to use more reference models, reference models satisfying primary specifications or specifications with a higher priority may be selected. In some embodiments, the specifications to be satisfied by reference models may be fewer than the specifications to be satisfied by past cases. The base model list may list the reference models or past cases in descending order of the number of the specifications satisfied.

In the base model selection process shown in FIG. 4, a past-case specification data search is performed when no reference model satisfies the requested specifications. A past-case specification data search may also be performed when at least one reference model satisfies the requested specifications. Thus, a list listing the past cases together with the reference models can be output.

The hardware structures and the flowcharts described in the above embodiments are mere examples, and may be changed or modified as appropriate. The functions implemented by the storage 100 and the calculator 200 may be implemented by a common computer system instead of a dedicated system.

For example, programs implementing the operations of the above embodiments may be stored, for distribution, in a non-transitory computer-readable recording medium, such as a compact disc read-only memory (CD-ROM), a digital versatile disc (DVD), a magneto-optical (MO) disk, or a memory card. The programs are installed in a computer to perform the above processing. In the system with the above functions implemented partly by an operating system (OS) or through cooperation between the OS and applications, portions related to the part other than the OS may be stored in a medium.

This application claims the benefit of Japanese Patent Application No. 2019-2364, filed on Jan. 10, 2019, the entire disclosure of which is incorporated by reference herein.

REFERENCE SIGNS LIST

1 Base model selection device
100 Storage
110 Base model master data
200 Calculator
201 Master data generator
202 Request specification acquirer
203 Searcher
204 List creator
300 Input device
400 Output device
501 Reference-model specification D/B
502 Past-case specification D/B
503 Case cost D/B
504 Past-case assessment result D/B

The invention claimed is:
1. A base model selection device comprising:
memory to store a program for performing operations to select a base model;
a storage to store base model master data including specification data for plural reference models and specification data for past cases;
a processor to execute the program and be configured to:
    receive at least one model name input through an input device;
    generate the base model master data for storage by acquiring the specification data from remote databases based on the at least one model name;
    perform a data search on the base model master data using a requested specification as a search key; and
    create a base model list listing a base model selected from the data search and specification data for the base model,
    wherein to perform the data search, the processor is configured to:
        categorize individual elements of the requested specification based on at least one of an importance of specification, modification difficulty, and costs for modification;
        determine whether at least one reference model of the plural reference models satisfies the requested specification,
        select, in response to the at least one reference model of the plural reference models satisfying the requested specification, the at least one reference model of the plural reference models and add the at least one reference model of the plural reference models to the base model list,
        select, in response to the plural reference models dissatisfying the requested specification, a base model satisfying the requested specification from the past cases and add the base model selected from the past cases to the base model list, and
        arrange the selected base models in the base model list in order from a reference model satisfying a specification with a higher priority using the categorization of the individual elements of the specification data, wherein the base model master data stored in the storage further includes a cost detail and a total cost of each of the past cases, and wherein the list creator creates and outputs a list listing the past cases in ascending order of the total cost for each of the past cases.

2. The base model selection device according to claim 1, wherein the specification data for the plural reference models, the specification data for the past cases, and the requested specification each include driving performance, and to perform the data search the processor is further configured to determine that the requested specification matches a specification of the at least one reference model of the plural reference models in response to the driving performance in the requested specification being within a range predetermined for the driving performance of the at least one reference model of the plural reference models.

3. The base model selection device according to claim 2, wherein to perform the data search the processor is further configured to determine that the requested specification matches the specification of the at least one reference model of the plural reference models in response to the driving performance in the requested specification being within a range acquired by lowering a lower limit of the range acquired by multiplying the driving performance of the at least one reference model of the plural reference models by the predetermined ratio.

4. The base model selection device according to claim 1, wherein the base model master data stored in the storage further includes a shipment start time of each of the past cases, and the total cost is acquired by converting a cost at the shipment start time into a current cost.

5. The base model selection device according to claim 1, wherein the base model master data stored in the storage further includes an assessment result of each of the past cases, and to create the list the processor is further configured to create a list listing the past cases in descending order of assessment of each of the past cases.

6. The base model selection device according to claim 1, wherein the requested specification includes a primary specification and a supplementary specification, and to perform the operations of the searcher the processor is further configured to add, in response to at least one of the plural reference models satisfying the primary specification included in the requested specification, the at least one reference model of the plural reference models to the base model list.

7. The base model selection device according to claim 1, wherein the requested specification includes a plurality of specifications with a priority, and to perform the operations of the list creator the processor is further configured to create a list listing the reference models in order from a reference model satisfying a specification with a higher priority included in the requested specification.

8. The base model selection device according to claim 1, wherein the base model master data further includes specification data for reference development base models, the plural reference models are included in the reference development base models and each have a specification including a predetermined optional specification, and to perform the data search the processor is further configured to:
determine whether at least one of the reference development base models satisfies the requested specification, determine, in response to at least one of the reference development base models satisfying the requested specification, whether the at least one reference development base model includes the at least one reference model of the plural reference models, the reference model having an optional specification matching the requested specification, select, in response to the at least one reference development base model including the at least one reference model of the plural reference models, the reference model having the optional specification matching the requested specification, the at least one reference model of the plural reference models, the reference model having the optional specification matching the requested specification, select, in response to the at least one reference development base model including no reference model of the plural reference models, the reference model having an optional specification matching the requested specification, the at least one reference development base model satisfying the requested specification, and select, in response to the reference development base models dissatisfying the requested specification, a base model satisfying the requested specification from the past cases.

9. A base model selection method comprising:

performing, by a processor, a data search, using a requested specification as a search key, on base model master data including specification data for plural reference models and specification data for past cases; and creating, by the processor, a base model list listing a base model selected in the data search and specification data for the base model, wherein the data search includes:
receiving, by the processor, at least one model name input through an input device;

generating, by the processor, the base model master data by acquiring the specification data for the plural reference models and specification data for the past cases from remote databases based on the at least one model name;

categorizing, by the processor, individual elements of the requested specification based on at least one of an importance of specification, modification difficulty, and costs for modification;

determining, by the processor, whether at least one reference model of the plural reference models satisfies the requested specification, selecting, by the processor, in response to the at least one reference model of the plural reference models satisfying the requested specification, the at least one reference model of the plural reference models, selecting, by the processor, in response to the plural reference models dissatisfying the requested specification, a base model satisfying the requested specification from the past cases, and arranging, by the processor, the selected base models in the base model list in order from a reference model satisfying a specification with a higher priority using the categorization of the individual elements of the specification data, the base model master data further includes a cost detail and a total cost of each of the past cases, and the creating includes creating, by the processor, a list listing the past cases in ascending order of the total cost for each of the past cases, and outputting the list to an interface.

10. A base model selection method comprising:

performing, by a processor, a data search, using a requested specification as a search key, on base model master data including specification data for reference development base models, specification data for reference models, and specification data for past cases; and creating, by the processor, a base model list listing a base model selected in the data search and specification data for the base model, wherein the plural reference models are included in the reference development base models and each have a specification including a predetermined optional specification, and the data search includes:

receiving, by the processor, at least one model name input through an input device;

generating, by the processor, the base model master data by acquiring the specification data for the plural reference models and specification data for the past cases from remote databases based on the at least one model name;

categorizing, by the processor, individual elements of the requested specification based on at least one of an importance of specification, modification difficulty, and costs for modification;

determining, by the processor, whether at least one of the reference development base models satisfies the requested specification, determining, by the processor, in response to at least one of the reference development base models satisfying the requested specification, whether the at least one reference development base model includes at least one reference model of the plural reference models, the reference model having an optional specification matching the requested specification, selecting, by the processor, in response to the at least one reference development base model including the at least one reference model of the plural reference models, the reference model having the optional specification matching the requested specification, the at least one reference model of the plural reference models, the reference model having the optional specification matching the requested specification, selecting, by the processor, in response to the at least one reference development base model including no reference model of the plural reference models, the reference model having an optional specification matching the requested specification, the at least one reference development base model satisfying the requested specification, selecting, by the processor, in response to the reference development base models dissatisfying the requested specification, a base model satisfying the requested specification from the past cases, and arranging, by the processor, the selected base models in the base model list in order from a reference model satisfying a specification with a higher priority using the categorization of the individual elements of the specification data.

11. The base model selection device according to claim 1, wherein the specification data for the reference models, the specification data for the past cases, and the requested specification each include driving performance, and to perform the data search the processor is further configured to determine that the requested specification matches a specification of the at least one reference model of the plural reference models in response to the driving performance in the requested specification being within a range acquired by multiplying the driving performance of the at least one reference model by a predetermined ratio.

12. The base model selection device according to claim 2, wherein the base model master data further includes specification data for reference development base models, the plural reference models are included in the reference development base models and each have a specification including a predetermined optional specification, and to perform the data search, the processor is further configured to:

determine whether at least one of the reference development base models satisfies the requested specification, determine, in response to at least one of the reference development base models satisfying the requested specification, whether the at least one reference development base model includes the at least one reference model of the plural reference models, the reference model having an optional specification matching the requested specification, select, in response to the at least one reference development base model including the at least one reference model of the plural reference models, the reference model having the optional specification matching the requested specification, the at least one reference model of the plural reference models, the reference model having the optional specification matching the requested specification, select, in response to the at least one reference development base model not including a reference model of the plural reference models, the reference model having an optional specification matching the requested specification, the at least one reference development base model satisfying the requested specification, and select, in response to the reference development base models dissatisfying the requested specification, a base model satisfying the requested specification from the past cases.

13. The base model selection device according to claim 3, wherein the base model master data further includes specification data for reference development base models, the plural reference models are included in the reference development base models and each have a specification including a predetermined optional specification, and to perform the data search the processor is further configured to:
- determine whether at least one of the reference development base models satisfies the requested specification,
- determine, in response to at least one of the reference development base models satisfying the requested specification, whether the at least one reference development base model includes the at least one a reference model of the plural reference models, the reference model having an optional specification matching the requested specification,
- select, in response to the at least one reference development base model including the at least one reference model of the plural reference models, the reference model having the optional specification matching the requested specification, the at least one reference model of the plural reference models, the reference model having the optional specification matching the requested specification,
- select, in response to the at least one reference development base model including no reference model of the plural reference models, the reference model having an optional specification matching the requested specification, the at least one reference development base model satisfying the requested specification, and
- select, in response to the reference development base models dissatisfying the requested specification, a base model satisfying the requested specification from the past cases.

14. The base model selection device according to claim 4, wherein
the base model master data further includes specification data for reference development base models,
the plural reference models are included in the reference development base models and each have a specification including a predetermined optional specification, and
to perform the data search the processor is further configured to:
- determine whether at least one of the reference development base models satisfies the requested specification,
- determine, in response to at least one of the reference development base models satisfying the requested specification, whether the at least one reference development base model includes the at least one reference model of the plural reference models, the reference model having an optional specification matching the requested specification,
- select, in response to the at least one reference development base model including the at least one reference model of the plural reference models, the reference model having the optional specification matching the requested specification, the at least one reference model of the plural reference models, the reference model having the optional specification matching the requested specification,
- select, in response to the at least one reference development base model including no reference model of the plural reference models, the reference model having an optional specification matching the requested specification, the at least one reference development base model satisfying the requested specification, and
- select, in response to the reference development base models dissatisfying the requested specification, a base model satisfying the requested specification from the past cases.

15. The base model selection device according to claim 5, wherein
the base model master data further includes specification data for reference development base models,
the plural reference models are included in the reference development base models and each have a specification including a predetermined optional specification, and
to perform the data search the processor is further configured to:
- determine whether at least one of the reference development base models satisfies the requested specification,
- determine, in response to at least one of the reference development base models satisfying the requested specification, whether the at least one reference development base model includes the at least one reference model of the plural reference models, the reference models having an optional specification matching the requested specification,
- select, in response to the at least one reference development base model including the at least one reference model of the plural reference models, the reference model having the optional specification matching the requested specification, the at least one reference model of the plural reference models, the reference model having the optional specification matching the requested specification,
- select, in response to the at least one reference development base model including no reference model of the plural reference models, the reference model having an optional specification matching the requested specification, the at least one reference development base model satisfying the requested specification, and
- select, in response to the reference development base models dissatisfying the requested specification, a base model satisfying the requested specification from the past cases.

16. The base model selection device according to claim 6, wherein
the base model master data further includes specification data for reference development base models,
the plural reference models are included in the reference development base models and each have a specification including a predetermined optional specification, and
to perform the data search the processor is further configured to:
- determine whether at least one of the reference development base models satisfies the requested specification,
- determine, in response to at least one of the reference development base models satisfying the requested specification, whether the at least one reference development base model includes the at least one reference model of the plural reference models, the reference model having an optional specification matching the requested specification,
- select, in response to the at least one reference development base model including the at least one reference model of the plural reference models, the reference model having the optional specification matching the requested specification, the at least one reference model of the plural reference models, the reference model having the optional specification matching the requested specification, select, in response to the at least one reference development base model including no reference model of the plural reference models, the reference model having an optional specification matching the requested specification, the at least one reference development base model satisfying the requested specification, and select, in response to the reference development base models dissatisfying the requested specification, a base model satisfying the requested specification from the past cases.

17. The base model selection device according to claim 7, wherein the base model master data further includes specification data for reference development base models, the reference models are included in the reference development base models and each have a specification including a predetermined optional specification, and to perform the data search the processor is further configured to:

determine whether at least one of the reference development base models satisfies the requested specification, determine, in response to at least one of the reference development base models satisfying the requested specification, whether the at least one reference development base model includes the at least one reference model of the plural reference models, the reference model having an optional specification matching the requested specification, select, in response to the at least one reference development base model including the at least one reference model of the plural reference models, the reference model having the optional specification matching the requested specification, the at least one reference model of the plural reference models, the reference model having the optional specification matching the requested specification, select, in response to the at least one reference development base model including no reference model of the plural reference models, the reference model having an optional specification matching the requested specification, the at least one reference development base model satisfying the requested specification, and selects, in response to the reference development base models dissatisfying the requested specification, a base model satisfying the requested specification from the past cases.

* * * * *